March 31, 1970
K. EICKMANN
3,503,574
FLUID POWER OPERATED VEHICLE GROUPS Filed May 27, 1966

INVENTOR
KARL EICKMANN

BY

ATTORNEYS

March 31, 1970 K. EICKMANN 3,503,574
FLUID POWER OPERATED VEHICLE GROUPS
Filed May 27, 1966 6 Sheets-Sheet 3

INVENTOR
KARL EICKMANN

BY
ATTORNEYS

March 31, 1970 K. EICKMANN 3,503,574
FLUID POWER OPERATED VEHICLE GROUPS
Filed May 27, 1966 6 Sheets-Sheet 5

Fig. 5

INVENTOR
KARL EICKMANN

BY

ATTORNEYS

March 31, 1970 K. EICKMANN 3,503,574
FLUID POWER OPERATED VEHICLE GROUPS
Filed May 27, 1966 6 Sheets-Sheet 6

INVENTOR
KARL EICKMANN

BY

ATTORNEYS

United States Patent Office 3,503,574
Patented Mar. 31, 1970

3,503,574
FLUID POWER OPERATED VEHICLE GROUPS
Karl Eickmann, 2420 Isshiki, Hayama-machi,
Kanagawa-ken, Japan
Filed May 27, 1966, Ser. No. 553,364
Int. Cl. B64f 3/00
U.S. Cl. 244—17.17                                    4 Claims

ABSTRACT OF THE DISCLOSURE

A vehicle group is formed of a flying vehicle and a base unit. Fluid power producing means are positioned in the base unit for supplying pressurized fluid to fluid motors located in the flying vehicle for rotating propulsion elements, such as propellers, which determine the attitude and movement of the flying vehicle. The power producing means and fluid motor are interconnected by fluid passageways for circulating the pressurized fluid to the fluid motor and then returning it to the power producing means. In order to control the attitude and the movement of the flying vehicle bypass conduits and valves are arranged in the flow passageways for varying the flow of pressurized fluid to individual fluid motors and additional control means are provided for regulating the flow of pressurized fluid to the fluid motors. The control means may be positioned in either the flying vehicle or the base vehicle. In some arrangements of the vehicle groups, connecting means are provided between the flying vehicle and the base unit so that one can be pulled or towed by the other. The connecting means may contain a spring assembly to prevent or at least limit any transmission of uneven movement or vibration between the flying vehicle and the base unit.

The base unit may be stationary or movable. The flying vehicle may be used as a conveyance for passengers and/or freight or it may be utilized as a crane or lifting device.

---

This invention relates to fluid power operated vehicle groups wherein a fluid power producing means is provided in a base unit or vehicle connected to a fluid an air borne vehicle having rotors for bearing or moving the fluid borne vehicle in or through fluid. The fluid borne vehicle is maneuverable independently of the base vehicle but is connected to the base vehicle by flexible fluid lines, so that fluid power is transferred from the fluid power producing means through fluid lines to one or more fluid motors located in the fluid borne vehicle for revolving rotor means thereon and then is returned through other fluid lines back to the base vehicle.

An object of my copending patent application S.N. 368,820 is, to control the attitude of an air borne vehicle utilizing bypass means, which are located in at least one of the fluid lines providing power to the propulsion means of the vehicle.

Hydraulically operated vehicle groups are described basically in my Patent 3,245,637. Control means for hydraulically operated helicopters are described in another of my co-pending patent applications S.N. 368,880 of May 20, 1964. This present invention deals with improvements in the application of fluid flow control means to hydraulically operated vehicle groups. The improvements exist in the provision of control means for an improved maneuverability of the members of the vehicle group and in the provision of additional means for improving the application, utilization and smoothness of operation of fluid power operated vehicle groups.

It is, therefore, an object of this invention to improve fluid flow control means to a fluid power operated vehicle group for controlling the attitude and movement of the air borne member of the vehicle group.

Another object of the invention deals with the operation of the vehicle group over land, and in or over water further specific means are provided for operation over snow and ice.

A further object of the invention is to provide shock absorbing means between a plurality of vehicles in a vehicle group for preventing the transfer of any uneven motion and vibration from one to another of the vehicles.

It was one object of my Patent 3,245,637 to increase the lifting capacity of one or a number of helicopters in the same helicopter group and also to increase the lifting capacity of each helicopter in a helicopter group by providing the power supply in a separate base vehicle and to supply the hydraulic power by means of pipes or tubes to the individual members of the helicopter group.

Another object of the above inventions was to use a fluid, and especially a hydraulic fluid, as the medium for transferring power from the base vehicle to the helicopters. This patent also provided for the independent maneuverability of each vehicle of the vehicle group and for control means in the vehicles.

However, there was no disclosure of how to maintain the stability of the airborne vehicle in combination with its control of the attitude and movement.

This present invention overcomes this drawback by maintaining the stability of location of the airborne vehicle and at the same time by controlling its attitude and movement by including a control of the rate and proportion of flow of pressurized fluid to the individual motors of the airborne members of the vehicle group.

A preferred embodiment of the invention is therefore, to provide a plurality of bodies in combination; comprising at least one flying body driven by fluid power supplied from another body of the plurality of bodies and maneuverable independently of the other body. Fluid flow producing means are carried by at least one of said plurality of bodies; and at least a pair of revolving propulsion elements create at least a pair of fluid stream for providing the thrust for determining the attitude and movement of the flying body. A positive displacement fluid motor is provided on the flying body for rotating the propulsion elements. Conduit means extend between the fluid flow producing means and at least one of the fluid motors for supplying fluid under pressure to the fluid motor to rotate the propulsion member element and to return the fluid at least indirectly to the fluid flow producing means. The conduit means being of a material and length permitting movement of bodies independent of one another. The conduit means from fluid passageways communicating with the fluid motor and bypass means associated with the fluid passageways regulate the flow of fluid under pressure for proportioning flow to the fluid motors and in turn controlling the angular velocity of the propulsion elements. Control means provided on at least one of the bodies for governing the rate of pressurized fluid flow to the fluid motors for controlling the stability of the flying body by defining the thrust of the fluid streams in dependence on the rotary angular velocity of the propulsion elements.

Another object of the invention is to provide means for operating a flying body which include means extending to the fluid power producing means in the other body for controlling the rate of fluid flow supplied therefrom.

According to another object of the invention all control means are governed from a control station in the flying body.

In accordance with another embodiment of the invention the flying body or cabin vehicle is provided with control means for governing the forward speed of the vehicle group.

Another object of the invention is to provide the fluid line connected to the cabin vehicle with a control means or remote control means for controlling the power plant of the fluid flow delivery apparatus which is located in a base vehicle.

Another object of the invention is that the base vehicle is tracted or drawn during its movement by the airborne cabin vehicle to which it is attached.

According to another object, however, the base vehicle may also tract or move the thereto connected airborne vehicle.

According to another object of the invention the airborne vehicle may be an aircraft or a body having wings.

According to another object of the invention one or more of the airborne vehicles of the vehicle group may have ducts or ring wing means for assisting in the lifting thrust of the vehicle and also for bearing the vehicle in the air in horizontal or inclined flight.

Another object of the invention is to provide a spring loaded connection in a tracting means between the base vehicle and the airborne vehicle.

Due to another object of the invention, the base vehicle may be a ship provided with cooling means for cooling the fluid of the hydraulic circuit.

Another object of the invention is to provide a base vehicle which may be a sled for sliding on snow, ice, or glaciers.

According to another object of the invention the cabin vehicle may have a plurality of wings and hydraulic motors positioned in the wings for driving propellers.

Still another object of the invention is to provide a base vehicle adapted to travel on an air cushion.

Another object of the invention is to provide a base vehicle which is a bottom effect vehicle for flying at a low altitude over the surface of land, water, ice or snow.

Still another object of the invention is, to provide a vehicle group which is especially directed to tracting objects for catching fish in lakes or oceans and the like.

According to another object of the invention the airborne vehicle of the vehicle group may be borne by propellers which are driven by hydraulic fluid motors connected in series and wherein by-pass valve means are provided between the "to" and "from" passages of the motors in order to control the forwards and backwards movement of the airborne vehicle or of the vehicle group.

According to a still further object of the invention the airborne vehicle of the vehicle group may also be provided with remote control means for controlling the power plant or fluid power producing device and the device for variably adjusting the fluid flow producing means in the base vehicle.

It is therefore also an object of the invention to provide a vehicle group wherein a cabin is provided in the upper, usually airborne, vehicle and all control means are available in this cabin so that persons can ride in the upper cabin vehicle and control the whole vehicle group therefrom and that they can tract the base vehicle behind the upper or air borne vehicle.

More objects, details and features of the invention will become apparent from the detailed study of the drawings, wherein:

FIGURE 4 is another embodiment of the vehicle group wherein the upper vehicle is an aircraft attached by connection means to the base vehicle which bear the power plant and the fluid flow producing device for driving the propellers of the aircraft. In this embodiment the base vehicle may be either an air cushion vehicle or a ground effect cushion vehicle for movement at a certain distance above the surface of land, water, ice, glaciers and the like.

In the drawings the pipes or tubes are shown partially in elevation and partially in section. The propellers and the fluid flow producing means, such as the engine or combustion engine or pump and/or hydro-fluid flow producing combustion engine, are also shown in the figures by simplified sketches only, because it is assumed that those skilled in the art can understand their probable structure and operation.

In the following detailed description, some of my patents or co-pending patents applications are cited, which show for example the kind of engines, pumps, motors of hydraulic fluid flow producing combustion engines which might be provided in the vehicle group, but the mentioning of these patents is by way of example only. It would also be possible to replace the hydraulic motors, hydraulic pumps or hydraulic fluid flow producing combustion engines by modifications of other of my patents or by other oil hydraulic motors, hydraulic pumps or combustion engines.

Figure 1:
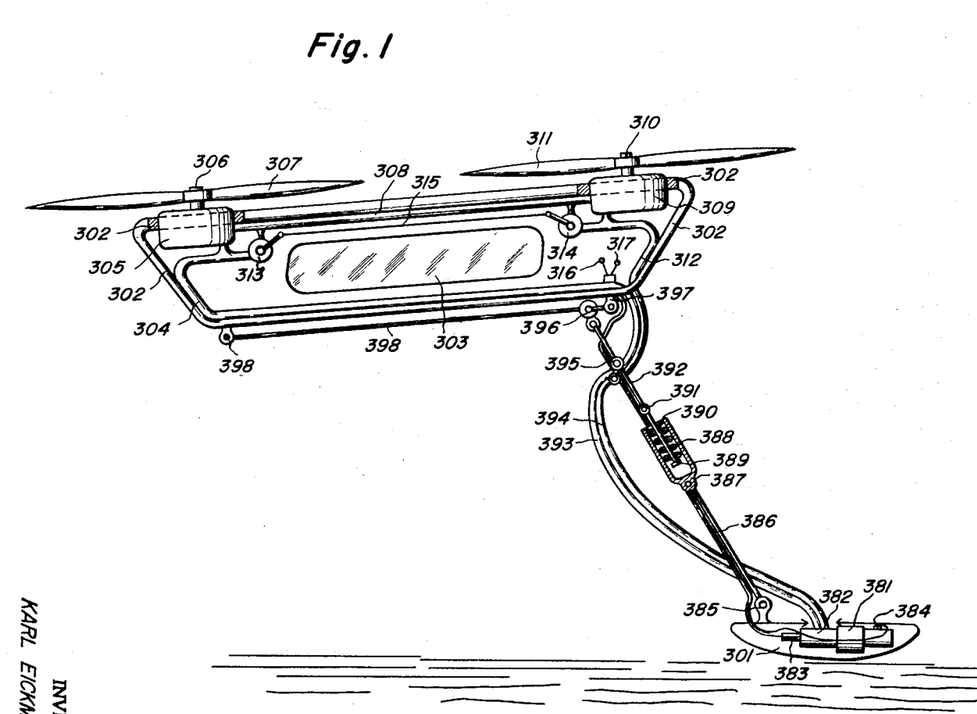
FIGURE 1 shows an embodiment of the invention wherein the base vehicle contains the fluid flow delivery device and wherein the base vehicle is connected by a tracting or towing means and to a fluid line to the upper cabin vehicle and control means are provided in the upper cabin vehicle for controlling the forward and backward movement of the vehicle group in such a way that the upper vehicle tracks the base vehicle. According to an other feature of the embodiment of FIGURE 1 a spring loaded tracting connecting means is provided and still another feature is, that the control means in the upper vehicle control the power plant and the fluid flow producing means in the base vehicle by remote control.

The terms "substantial or definite proportional" or "substantial or definite or proportionate angular rotary velocity" shall mean, in this specification, that the rotary or angular velocities are as definite proportional or equal as possible in the operation of positive displacement hydraulic pumps or motors, tolerating only a few percent difference from the theoretical displacement or angular velocity values;

In FIGURE 1 a base vehicle 301 contains the power plant 381 with the control means 384 governing a hydraulic fluid flow producing means 382. Fluid flow producing means 382 is also provided with the control means 383 for adjusting the delivery quantity of fluid flow. The base vehicle is provided with a tracting connection fitting 385. The upper vehicle 301a has a cabin 303 vehicle and is provided with spaced connection fittings 397a, 397b and a connection slide means 398 extends between the fittings. Located on slide means 398 is a movable slide 396 to which the tracting connection means 392 is connected. Tracting connection means 392 may have a means 395 for bearing the fluid lines 393 and 394. Fluid lines 393 and 394 transfer pressurized between fluid the base vehicle and the upper vehicle. Connection tracting means 392 contain a spring piston means 391 which extends into a spring cylinder 387 having a spring means 388 mounted on a member 390. A spring retaining means 389 is provided on the end of spring piston means 391 and another spring retaining means may be provided on the opposite end of the spring guide means 387. Extending downwardly from the spring cylinder 387 is a connection tracting means 386 which is attached to the connection fitting 385 of the base vehicle. An altitude limitation device, not shown, may be connected to the fluid flow adjustment device for the purpose that if the upper vehicle flies in a too high inclined angle over the base vehicle that then the fluid flow adjustment device slows down the quantity of fluid delivered to the upper vehicle whereby it can not exceed a certain maximum altitude. If waves or wind are present the spring means 388 located between the base vehicle and the upper vehicle limit the transfer of uneven motion or vibrations. Fluid flows from the fluid flow or power producing means 382 through fluid line 393 and then through delivery passages 304 into a hydraulic motor 305 and drives the hydraulic motor 305 whereby the propeller 307, fastened to the motor 305 by shaft 306, is rotated.

The fluid which has driven the motor 305 then flows through medial passage 308 of fluid delivery line to a second fluid motor 309. The propeller 311 is connected to shaft 310 of the motor. From the second motor 309 the fluid enters return pipe 312 and passes through the return line 394 to the base vehicle. By-pass valve means 313 and 314 are provided between the fluid line 304 and the medial passage 308 and between the medial passage 308 and return pipe 312. The by-pass means 313 and 314 may be controlled by a combination control means 315 by which the rotary velocity of the motors 305 and 309 can be varied relatively to each other. Thereby propellers 307 or 311 may be revolved so that the upper vehicle inclines and thereby produces a forwards or backward movement. The whole upper vehicle may consist of the frame or body 302. A cabin 303 may be provided on the frame 302, and in the specification the upper vehicle will hereafter always be cited as a cabin vehicle. Thereby it shall be understood that generally the upper vehicle contains the space for riding persons in the vehicle group. If no cabin is provided we will still call the upper usually airborne vehicle the cabin vehicle while the base vehicle containing the power plant shall be called the base vehicle.

In the cabin or upper vehicle the control means 316 and 317 act as a remote control means for controlling the gas or other drive means of the power plant and the fluid flow delivery quantity adjustment device of the fluid flow producing means. Therefore by the control means which are provided in the cabin vehicle the vehicle group can be completely controlled especially for its forward, backward and up and down movement. In this example and in the embodiment shown in FIGURE 3 the cabin vehicle will mostly tract the base vehicle.

Figure 2:
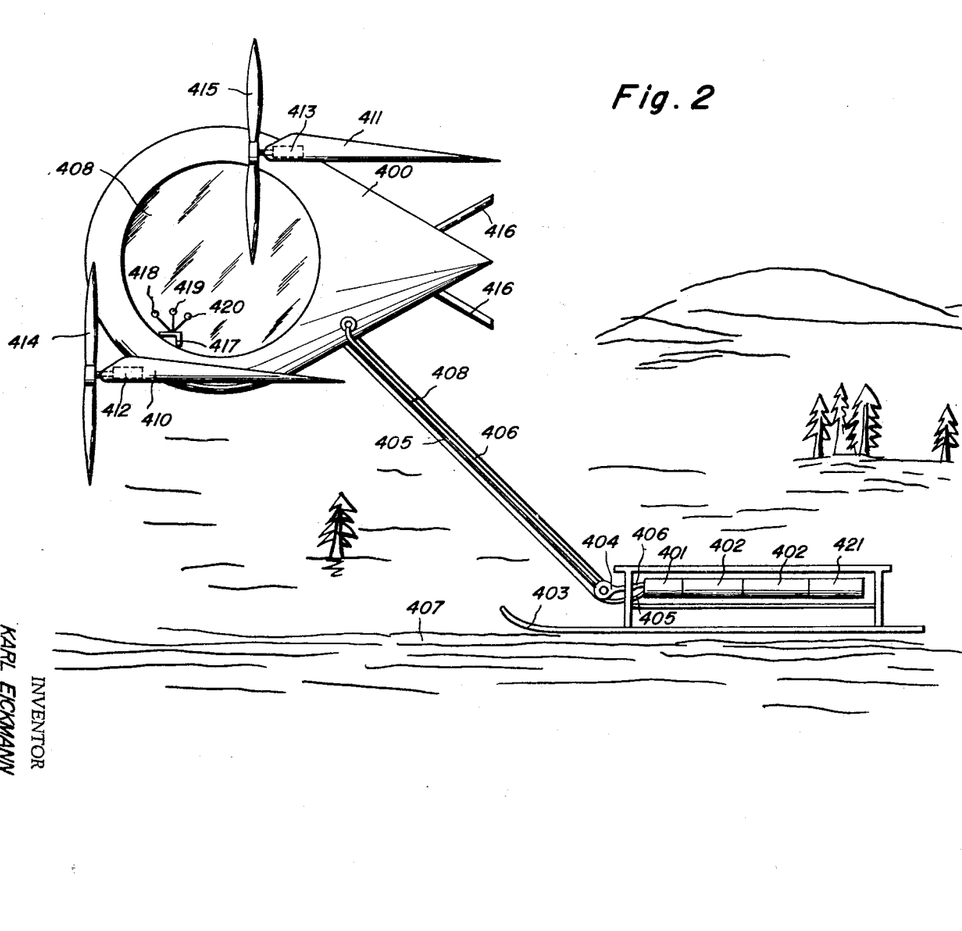
FIGURE 2 shows a vehicle group wherein the base vehicle is a sled for sliding on ice, snow, and glaciers and wherein the upper vehicle is an aircraft and the base vehicle is tracted by the aircraft and the means for controlling the helicopter or vehicle group are provided in the airborne, or upper vehicle.

FIGURE 2 another embodiment of this vehicle group of the invention is shown in which the base vehicle 401 is a sled for sliding on snow, ice, or a glacier surface. The surface, 407, indicating ice on an ocean or snow on a land scape. Base vehicle 401 has runners 403 and contains the power plant 402. It may also contain cooling means 421. The base vehicle is provided with a connection fitting 404 from which a connection line 408 extends to the upper or cabin vehicle 400. The power plants 402 driving a fluid flow producing means or they are fluid flow producing means. From the base vehicle the fluid lines 405 and 406 extend for the supply of fluid to the cabin vehicle and for its return to the base vehicle. The cabin vehicle 400 has a cabin 408. The body 400 of the cabin vehice is provided with wing means 410 and 411, preferably each one or more extending sidewards from the vehicle preferably symmetrically. Wing means 410 have hydraulic motors 412 and wing means 411 have hydraulic motors 413. Propellers 414 and 415 are connected to the hydraulic motors 412, 414 respectively and they are driven thereby. The upper or cabin vehicle has a landing means 416 for vertical take off and landings, and this means may also act as control means for controlling the sidewards movement of the upper vehicle or of the vehicle group. Further there may be a control panel 417 provided in the cabin vehicle with control means 418, 419 and 420. The last mentioned control means is used for the remote control of the delivery quantity adjustment devices or of the rotary velocity control devices of the power plants or fluid flow producing means or pumps in the base vehicle. The fluid under pressure flows from the fluid flow producing means in the base vehicle through one of the fluid line 405 or 406 to the upper or cabin vehicle and drives the hydromotors 412 and 413 and then returns through the other of the fluid lines to the base vehicle.

Also in this embodiment the upper or cabin vehicle or the base vehicle may tract the whole vehicle group. This embodiment is especially convenient for rescue operations in mountains or on water or snow and it is also very convenient for long distance or remote transportation purposes over snow, ice and the like.

Figure 3:
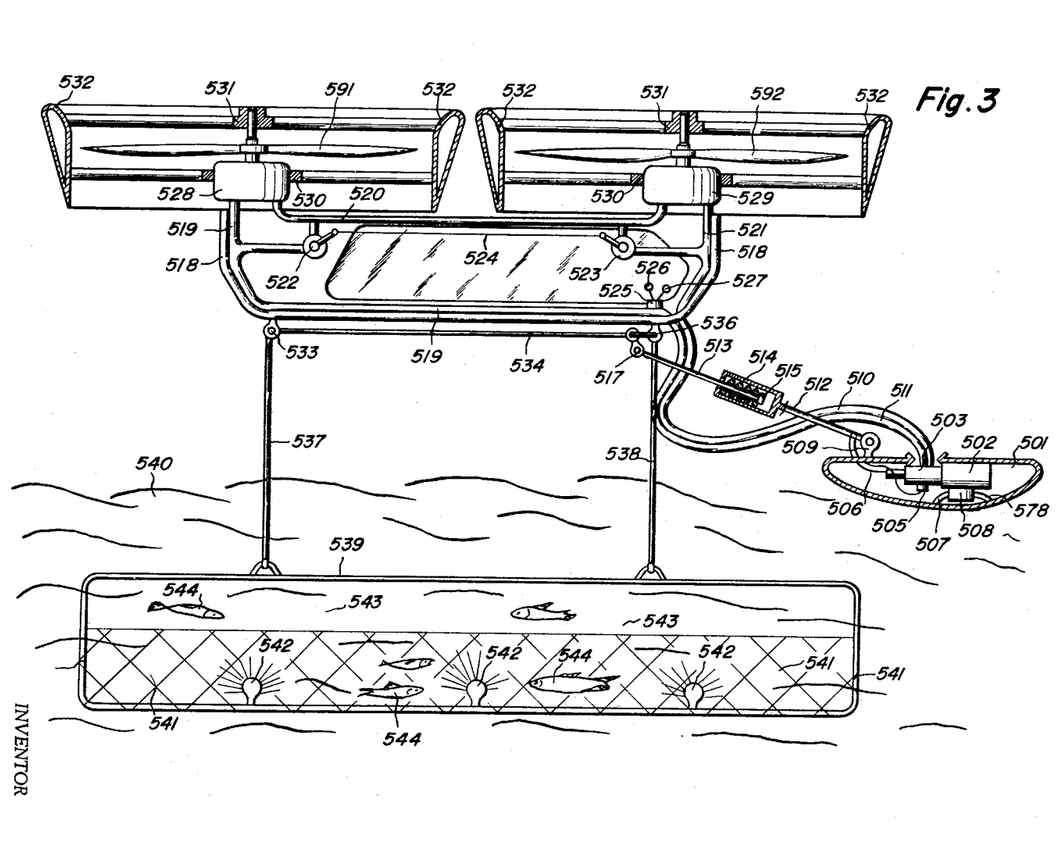
FIGURE 3 is another embodiment of the vehicle group wherein a fishing net is attached to the bottom of the upper or cabin vehicle and wherein the upper, or airborne vehicle is driven by pressurized fluid produced in the base vehicle and transferred to the upper vehicle via fluid lines, with, the vehicle group controlled from the upper vehicle; which preferably is a cabin vehicle for carrying passengers or freight and which may have, in addition, control means for upward and downward movement of the fishing net and for a tracking device for tracting objects from the surface or from below the water.

FIGURE 3 shows another embodiment of a vehicle group where again a base vehicle 501 is a water or floating vehicle and contains the power plant and fluid flow producing means for supplying fluid under pressure through fluid lines 510 or 511 to the upper vehicle or cabin vehicle 500. There are several special features provided in this embodiment of the invention. The first is that the base vehicle is provided with a cooling means 508 for cooling the fluid flow circuit by employing the water which the base vehicle 501 is borne. Passage means 507 and 578 circulate water through the cooling means 508. The base vehicle 501 also contains the power plant 502 and the fluid flow producing means 503 which has a delivery quantity adjustment device 505. This delivery quantity adjustment device is remotely controlled from the upper vehicle via the control level 526. The power plant is provided with a power supply control means 506 which is remotely controlled by the control means, 527 in the upper or cabin vehicle. The base vehicle 501 has a connection fitting 509 from which tracting means 512 and 513 extending to the connection fitting 517 which is attached to the movable slide member 534 connected to the spared connection means 533 and 536 secured to the upper or cabin vehicle 500a. The shock absorbing spring means 516 comprising a spring container 514 and spring 515 are provided between the individual tracting or connection means 512 and 513. Extending from the fluid flow producing means 503 are the fluid lines 510 and 511 to the upper vehicle. Fluid line 519 a continuation of fluid line 511, passes fluid under pressure to a first hydraulic motor 528 which is supported in bearing means 530 of a ring wing or duct means 532. Bearing means 531 are connected to the ring or duct means 532 for guiding the propeller shafts.

On the frame 518 of upper vehicle 500 are the dependent support members 537 and 538 attached to the connection means 533 and 536. The base vehicle 501 floats on the surface of water 540. Below the water a net 541 is provided and is held by the support members 537 and 538 from the upper or cabin vehicle. Net 541 is kept together by retaining means 539 and the net is provided with large entrances 543 so that fish 544 can enter into the net. Net 541 may also be provided with attention means 542, for instance like lamps or sound means, for attracting the fish 544 into the net 541. As soon as enough fish are inside the net 541, the upper vehicle may increase the rotary velocity of the propellers 591 and 592 by means of using either one or both of handles 526 and 527 for increasing either the rotary velocity of the power plant or in any case for increasing the delivery quantity of fluid produced in the fluid flow producing means 503, and thereby the upper vehicle raises into the air and lifts the net 541, if necessary, so far that it extends out of the water. Thereafter the control means 525 may be used and the vehicle group may move forward with full speed in order to bring the catch of fish 544 home.

Instead of using this vehicle group for catching fish it could be used as a means for rescuing persons from the water. Another possibility would be to use this vehicle group or combinations or modifications thereof in order to tract objects or to catch objects like torpedoes, mines, submarines or the like which might be submerged below the water.

Figure 4:
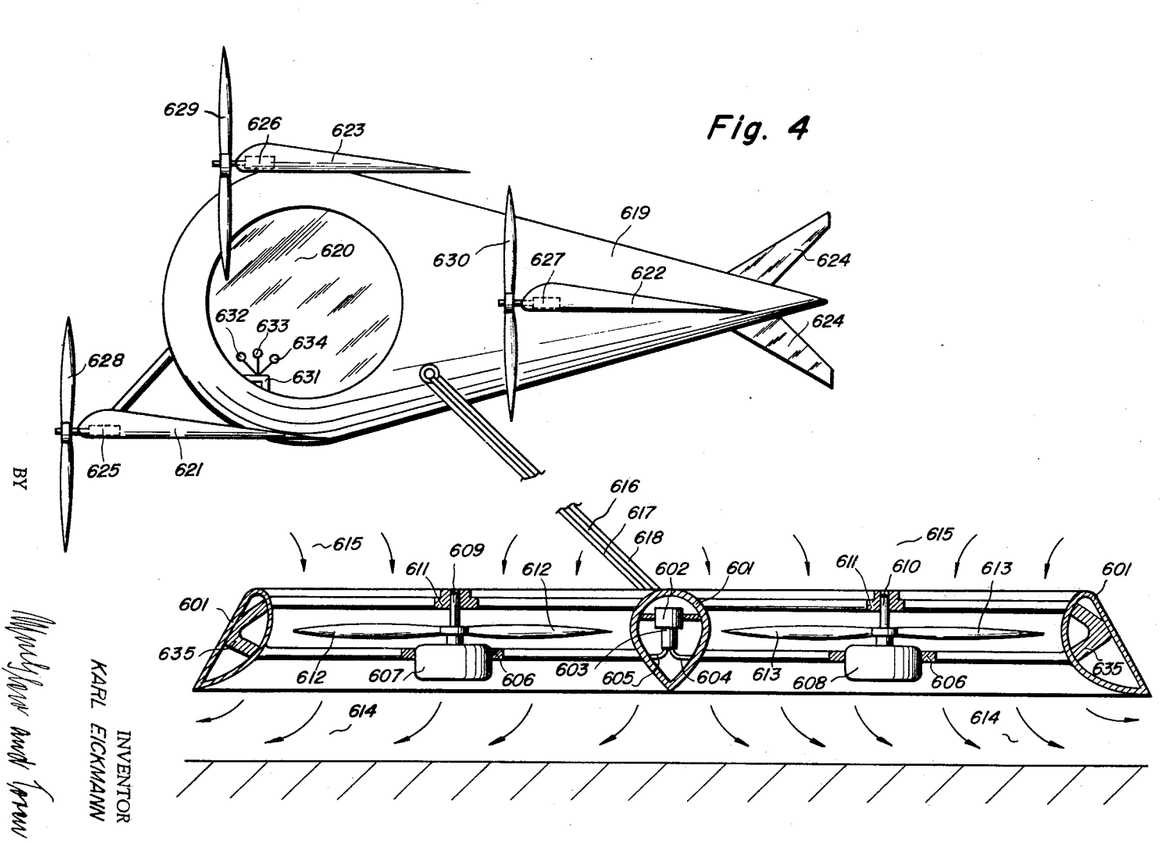

FIGURE 4 shows another embodiment of the vehicle group wherein the upper vehicle 600 is an aircraft substantially similar to that of FIGURE 2 but wherein the base vehicle 600a is either an air cushion vericle or a bottom effect vehicle.

The upper vehicle 600 has a body 619 and wings 621, 622 and 623 thereon. The wings are provided with hydraulic motors 625, 626 and 627. Control or landing wings 624 may also be provided on the aircraft. Each of the hydraulic motors has a shaft and bears a propeller thereon, 628, 629, 630. Wings may extend sidewards from the aircraft body and consequently six motors and propellers may be provided. Instead of providing this number any other number may also be suitable depending on design. The cabin 620 of upper vehicle 600 may be suitable for the passengers and it may also be provided with a control panel 631 having control levers and control means 632, 633 and 634 for controlling the rotary velocity of the power plant, for controlling the fluid flow delivery quantity from the fluid flow producing means and also for changing the relative rotary velocity of one or more of the motors for obtaining an inclination of the upper vehicle and thereby to control the forward or upwards movement of the upper vehicle. The upper vehicle is linked by connection means 616 to the base vehicle 600a. Fluid lines 617 and 618 extend from the base vehicle to the upper vehicle for the transfer of fluid under pressure to and from the upper vehicle. The control means 632, 633 and 634 remotely control the hydromotors 625, 626 and 627 in the upper vehicle, the power plant 602 in the base vehicle and the fluid flow delivery producing means 603 in the base vehicle. Fluid flow lines 604 and 605 extend from the power plant 603 to the fluid lines 617 and 618 or via other fluid lines to the upper vehicle. Fluid lines 604 and 605 may also extend to hydraulic motors 607 and 608, which are borne in bearing means 606 which are provided in a duct means 601. Duct means 601 has a strengthening or stabilization rib means 635. An upper bearing means 611 is also provided in the ducts for guiding the shafts 609, 610 of the hydromotors 607, 608.

Propellers 612, 613 are located on and are driven by the shafts of hydraulic motor 607 or 608 respectively in the base vehicle. Thus one or a number of power plants which fluid flow producing means 602 and 603 may be provided either on the upper vehicle or on the base vehicle but preferably on the base vehicle. The fluid flow producing means drive the hydraulic motors 607 and 608 in the base vehicle 600a and also the hydraulic motors 625, 626 and 627 in the cabin vehicle 600. These motors may be driven by fluid flow parallel connections or by fluid flow series connections. They may be driven by several or separated power plants. The revolving propellers 612 and 613 in the duct means 601 produce the downwards thrust by drawing air 615 from atop the base vehicle through the base vehicle and forcing it out downwardly thereby providing an air cushion 614 which supports the base vehicle 601 to a certain elevation above the surface of the land, water, ice or the like. If instead of a air cushion effect a bottom effect is used then the base vehicle may fly even higher above the surface than is usual for air cushion vehicles. While air cushion vehicles commonly fly only at a height above the surface which may be about a fifth to a tenth or less of the length of the base vehicle the bottom effect vehicles can fly almost at a height above the surface which may be a half of or almost the same height as the length or sidewards dimension of the body of base vehicle 600a. The feature of the embodiment of FIGURE 4 is that this vehicle group can move forward at a speed much higher than is possible for other embodiments of this invention. Another feature is that if the base vehicle 600a is supported by the bottom effect then the base vehicle can fly higher then common air cushion vehicles and also can fly over rougher territory than the presently known air cushion vehicles or hover crafts. Another feature is that the vehicle group can carry greater loads than a conventional aircraft or helicopter because the power plants are located in the base vehicle while the base vehicle is supported more efficiently than a poor airborne vehicle because it is supported by the bottom effect or by the air cushion effect.

Figure 5:
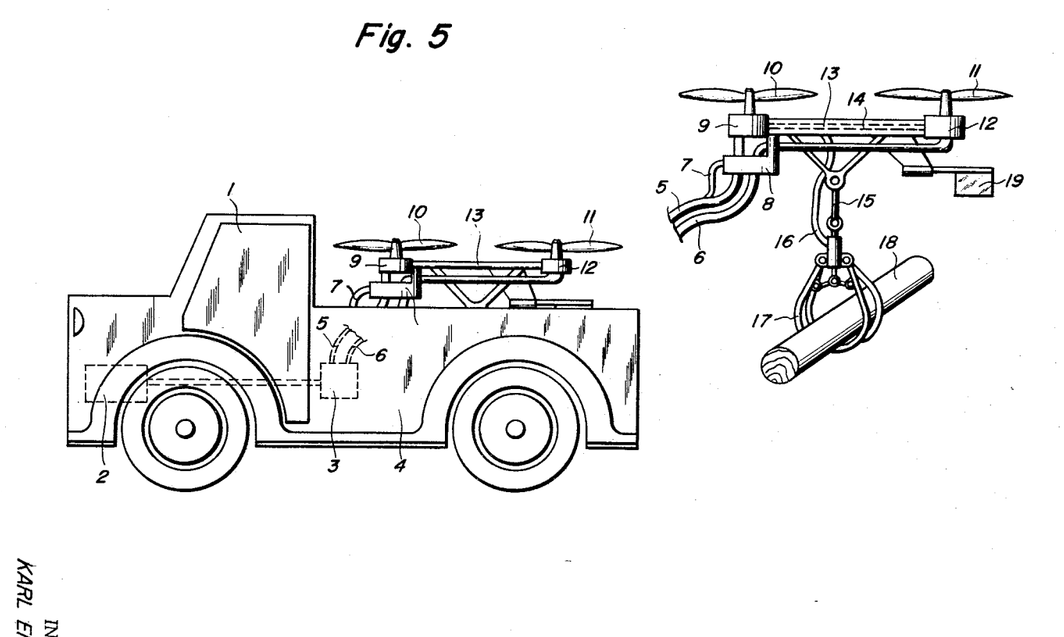
FIGURE 5 shows another example of the embodiment of the invention which demonstrates a vehicle group wherein the base vehicle is a truck or a car while the fluid borne or upper vehicle is an independently maneuverable vehicle which may act as a crane, lift- or transporting-means. The upper vehicle is removably mounted on the truck and is connected to it by flexible fluid lines permitting it independent movement.

Referring now to FIGURE 5 a vehicle group is demonstrated wherein the base vehicle is a car or truck 1. Inside of the truck is the engine or the power plant 2 which drives a pump or fluid flow producing means 3 for producing a separate flow of fluid or two separate flows of fluid 5 or 6. The fluid flow passes through respective flexible fluid lines to the respective upper vehicle 13. The upper vehicle 13 either can rest on the platform or body of the truck or it can part away from the vehicle but remaining connected to it by the fluid lines 5 or 6. The upper vehicle is dependently maneuverable and it consists of the body 13, the hydraulic motor 9 and its propeller 10 and the hydraulic motor 12 with its propeller 11. In this example the fluid flow 5 passes to the hydraulic motor 9 and then through a medial fluid line 14 to the other hydraulic motor 12 and returns through fluid line 6 to the base vehicle. A controller 8 is set between the fluid line 5 and the medial pipe 14 and the return pipe 6. The controller or orifice or by-pass means 8 or the combination of them may be operated for instance by remote control via the control line or means 7 for example, from the car or truck. The upper vehicle 13 can move through the air or through water and it may be provided with a hanger 15 and with carrying means 17 thereon for moving freight 18 and the means 17 or hanger 15 may be controlled by respective control means or remote control means 16, which may transfer or actuate respective commands. The illustration of this vehicle group is by way of example only, instead of connecting one vehicle to the truck there could also be a number of vehicles connected to it, and instead of driving the upper or fluid borne vehicle by one flow of fluid it could also be driven by a number of separate flows of fluid.

The upper vehicle may be provided with a wing 19 for controlling the sideward or turning movement of the vehicle.

Such a vehicle group is especially useful as a movable and flying crane. It may also be used as a power shovel, a winch or the like, for instance the truck may travel at high speed on the road or highway with the upper vehicle mounted on the truck. After it arrives at its destination for work, the truck may stop and the vehicle may then depart for picking up freight especially from inaccessible areas like deserts or jungles where land vehicles can not travel easily. The crane truck or the like which is provided by the upper vehicle can bring the freight either to the places or to the truck itself and it can thereby load the truck itself. Such a vehicle group may also serve for fertilizing agricultural areas, for instance if the truck drives along the field while the upper vehicle moves across the field and supplies the fertilizer thereover or picks up the ripe fruits of the harvest.

Figures 6, 7:
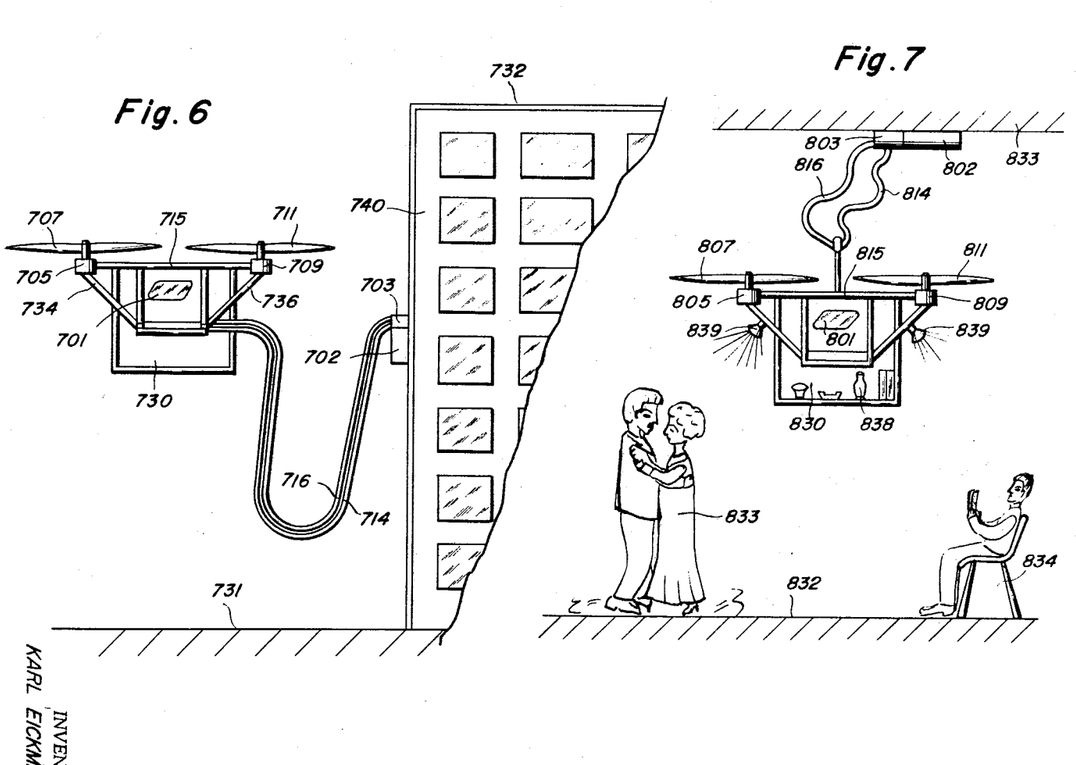
FIGURE 6 shows a view of the invention in which the power supply unit and the fluid flow producing device are located in a stationary base structure.
FIGURE 7 shows another embodiment of the invention like FIGURE 6, in which the fluid flow producing means and the power supply unit are positioned on a stationary base structure.

In FIGURE 6 the power plant 702 and fluid flow producing means are attached to a structure 740. Through the flexible fluid line 714 fluid flow producing means 703 supplies fluid under pressure to the flying vehicle 701, for serial flow through its delivery fluid line 734, through upstream fluid motor 705 for revolving rotor 707 thereof, through medial fluid line 715, through downstream fluid motor 709 for revolving rotor 711 thereof; through return fluid line 736 and then back from vehicle 701 through the flexible fluid line 716 directly or indirectly back to fluid flow producing means 703. The vehicle 701 may be provided with a freight space 730. Fluid flow control means of one or the other embodiments of this invention, which were described heretofore are provided to the above described fluid flow circuit and the piloting panel may be provided either in the airborne vehicle 701 or in the structure 740.

The vehicle 701 of FIGURE 6 is then very convenient for carrying freight or passengers from the ground 731 to the top 732 of the structure 740 or to carry freight or persons from the top or landing platform 732 of structure or housing 740 down to the ground 731. For very high structures it is preferred to move the body 702 which carries the powerplant and fluid flow producing means 703 upwards and downwards by separated drive means but in analogy with the movements of the vehicle 701. Since it is possible, according to the embodiment of FIGURE 6, that the airborne vehicle 701 flies higher than the structure, the systems disclosed makes it possible to build very high structures, higher than cranes, because the building material can be flown up to the top for increasing the height of the structure. Once the height of the structure is increased, the height of the guideway for moving plant 702 and device 703 can also be increased. It is convenient to provide four or more propellers on vehicle 701, and to surround them by ducts for prevention of collisions.

In FIGURE 7 the body 802, carrying fluid flow producing means 803 is fastened on the stationary structure 833. Flying body or vehicle 801, having a freight space 830 for carrying freight 838 is borne or moved by rotor members 807 and 811 which are revolved by fluid motors 805 and 809 is flexibly connected by fluid lines 814 and 816 to fluid flow producing means 803 of body 802, and moved independently thereof. The operation of the flying vehicle 801 for crane 801 is accomplished whereby the fluid flow producing means 803 presses a serial flow of fluid through fluid line 814, through fluid motor 805, through medial fluid line 815, through fluid motor 809 and through fluid line 816 back to the fluid flow producing means 803. The vehicle of FIGURE 7 may for example carry food or drinks 838, may carry lamps 839 into suitable heights over suitable locations or may carry any other freight.

It may also act as a movable fan means for providing cooling air streams to people during hot weather for carrying persons or machines for broadcasting, movie taking or television reporting—taking this vehicle provides possibility to survey the event from any suitable place in the air—respective control means of one or another embodiment of this invention may be connected to vehicle 801 in order to govern its maneuverability.

There have been several embodiments of the invention described in the figures, each has special features. It is, however, possible to combine details or features of one embodiment with another.

Further there are several modifications and improvements depending on design considerations or on actual applications without leaving the scope of this invention. The embodiments shown in the figures are by way of example only in order to demonstrate the many modification possibilities and the many practical uses of the vehicle group of this invention. Also very beneficial are the several tracting means and the several connection and control means in parts of the vehicle group.

Vehicle groups of this invention can also be used for preparatory purposes in pilot instruction and for practicing piloting. By riding first in upper vehicles of the vehicle groups the studying pilot gets necessary experience for later piloting of fluid borne vehicles, airborne vehicles, helicopters, aircrafts or the like.

A special feature of the invention is that the weight of the load which is to be carried and especially that of the power plant and the fuel etc. are taken away from the upper or cabin vehicle and are disposed in the base vehicle. Another feature is that the cabin vehicle can be almost completely silent because the base vehicle, containing the power plant, is remote from the cabin vehicle and no engines or power plants are directly on the cabin vehicle. Persons riding in the cabin vehicle can therefore enjoy a very restful and comfortable ride without noise or with relatively little noise. Further, the vehicle group can stand still over the ground so that the passengers in the cabin vehicle can survey the surface from an upper position. This is specially suitable for sight-seeing and also for viewing fish or other objects below the water level, because it is possible to look directly downwards through the water surface.

Such an arrangement gives a much better view than was heretofore possible from ships. The control means for controlling the helicopter group may also be used from my co-pending patent application, especially from my U.S. Patent application 368,820 of May 20, 1964 and of its continuation in part.

It is preferred to use very efficient and lighter weight pump means and fluid flow producing means for the embodiments of the invention. For instance such as disclosed, in my U.S. Patent 3,174,434 or thereto related patents or patent applications or those of my French Patents 1,345,785 or 1,365,281. The means of my Patent 3,211,399 may also be combined with the present invention and so may be the embodiments and parts of my co-pending U.S. patent application 368,881 or 368,883.

The vehicle groups of this invention can serve many practical applications. They are convenient for rescue and for safety purposes. The control means are very effective and there are many varieties of control means whereof only some are shown in the different embodiments of this invention. Also the configuration and design of the base vehicle and of the upper or cabin vehicle may be of different shapes whereof only some of the possibilities are shown in the several figures belonging to this patent specification.

Especially it is very often convenient or necessary to provide four or more rotary members on the flying body, in order to make its movement in any horizontal direction possible by providing fluid flow control means to each of at least four fluid motors for control of the rate of flow therethrough. By actuating one or two of the fluid flow control means the flying vehicle can be inclined into any desired direction for movement in that direction or away from it. Airborne vehicles with more than two propellers are not shown in the figures except FIGURE 4, because it is assumed, that those skilled in the art can understand their structure from this description and because the figures with only two propellers are easier to read. A preferred embodiment with the invention of full stability of movement or rest is attained by the provision of a plurality of bodies in combination comprising at least one flying body driven by fluid power supplied from another body of said plurality of bodies and maneuverable independently of said other body; and with fluid flow producing means carried by at least one of said plurality of bodies. At least a pair of revolving propulsion elements are disposed on the flying vehicle for creating at least a pair of fluid streams for providing a thrust and the controlling of the attitude and movement of said flying body. A positive displacement fluid motor is provided on said flying body and connected to each of the said revolving propulsion elements for causing rotation of the same. Conduit means extend between the fluid flow producing means and at least one of the fluid motors and between the bodies for supplying fluid under pressure from the fluid flow producing means to the fluid motor to cause rotation of the rotary parts thereof and of the thereto connected propulsion element and to return the fluid at least indirectly to the fluid flow producing means and being of a material and length permitting independent movement of the bodies. At least a pair of fluid passages communicate with fluid motors, and by-pass means associated with the fluid passages and the fluid under pressure provide substantially the required proportions of the rate of flow in the fluid passages, and the required proportions of the rotary angular velocity of the fluid motors and propulsion elements which are connected to and driven by said fluid under pressure, and control means communicated to at least one of the fluid passages for adding or subtracting a limited quantity of fluid to or out of the thereto communicated fluid passage for changing thereby the rotary angular velocity of one of the fluid motors and propulsion members relatively to the rotary angular velocity of others of said fluid motors and propulsion members to such an extent, that the thereby effected thrust of one of the fluid streams governs the inclination and movement of at least one of the bodies.

A good control of the stability and movement of the airborne vehicle can also be achieved by governing the required proportion of the rotary velocity of fluid-motors, rotor members and fluid streams by means of a plurality of separate flows of fluid of proportionate rate of flow led through separate flexible fluid lines to different fluid motors of the flying body for driving the fluid motors with definite proportionate or equal rotary angular velocity. Such a system is also not illustrated in the drawings, because of the belief, that those skilled in the art can understand the structure from this description.

A very convenient embodiment of the vehicle group of this invention, mostly utilizing four propellers, driven by two separated flows of fluid with each two fluid motors in series, has been tried out, designed in detail and proven as inexpensive, easily to be piloted, stable and safe in operation and as definitely and accurately controllable for vertical and horizontal movement of the flying vehicle. The embodiment is defined by a plurality of bodies in combination; comprising at least one flying body driven by fluid power supplied from another body of said plurality of bodies and movable independently of the other body. Fluid flow producing means are carried by at least one of the plurality of bodies; and at least a pair of revolving propulsion elements for creating at least a pair of fluid streams for providing a thrust and thereby controlling the attitude and movement of said flying body. A positive displacement fluid motor is provided on the flying body and is connected to each of the revolving propulsion elements for causing rotation of the same. Conduit means extend between the fluid flow producing means and at least one of the fluid motors and between said bodies for supplying fluid under pressure from the fluid flow producing means to the fluid motor to cause rotation of its rotary parts and of the propulsion member element connected to it and to return the fluid at least indirectly to said fluid flow producing means. The conduit means being of a material and length permitting independent movement of the bodies. The fluid flow producing means includes separate positive displacement chamber groups; with each of said groups providing the supply of a separate flow of fluid of proportionate rate of flow relatively to at least one other flow of fluid. A plurality of power fluid conduits communicated to said fluid flow producing means and each of the power fluid conduits communicated to a different one of the fluid motors; and at least two pairs of fluid passages communicated to at least four fluid motors and maintained in flow separation association with the fluid passages and the fluid under pressure for providing substantially the required rate of flow in the fluid passages and the required proportion of the rotary angular velocity of the fluid motors and at least four propulsion elements which are connected to and driven by the fluid under pressure. Control means communicated to at least one of the fluid passages for adding or subtracting a limited quantity of fluid to or out of the thereto communicated fluid passage for changing thereby the rotary angular velocity of one of the fluid motors and propulsion members relatively to the rotary angular velocity of others of said fluid motors and propulsion members in such an extent, that the thereby effected thrust of one of the fluid streams governs the inclination and movement of at least one.

The features and characteristics of one of the embodiments of this invention may be interchanged with or included in other suitable embodiments of this invention.

If the control means are suitably utilized, then the vertical as well as the horizontal movements, inclinations and locations of at least one body of a vehicle group are kept stable and accurately governed by the simple and reliable control combinations of this invention.

The invention is illustrated and described by way of example only. It should be understood that the invention is not restricted to the description or drawings which are shown in the specification but shall cover by suitable expressions in the claims, whatever patentable novelty resides in the invention.

What is claimed is:

1. A vehicle group comprising a base unit and a flying vehicle, fluid power producing means located in said base unit, at least two rotating propulsion elements mounted on said flying vehicle for determining the attitude and movement of the vehicle, a positive displacement fluid motor associated with each of said propulsion elements for rotating said elements, said fluid motors disposed in said flying vehicle, conduit means forming fluid flow passageways between said fluid power producing means in said base unit and said fluid motors in said flying vehicle for supplying pressurized fluid to said fluid motors for rotating said propulsion elements and for returning the pressurized fluid to said fluid power producing means, means disposed in said conduit means for regulating the flow of pressurized fluid to individual ones of said fluid motors, control means for controlling the flow of pressurized fluid from said fluid power producing means to said fluid motors, whereby the attitude and movement of the flying vehicle is governed, a connection device being secured to said base unit and to said flying vehicle for affording tracting means between said base unit and flying vehicle, and said connection device comprising a first member connected to said flying vehicle, a second member connected to said base unit and a spring means interconnecting said first and second members whereby uneven motion and vibrations on the part of one of said flying vehicle and base unit is at least partially absorbed in the spring means and to the extent absorbed is not transmitted to the other of said flying vehicle and base unit.

2. A vehicle group as set forth in claim 1, wherein a longitudinally extending slide member is provided on said flying vehicle, a connection member slidably positionable on said slide member, said connection member secured to said first member of said connection device whereby during relative movement of said flying vehicle and base unit, said connection member is slidably positionable along slide member.

3. A vehicle group as set forth in claim 2, wherein said base unit is movable separately from said flying vehicle.

4. A vehicle group as set forth in claim 2, wherein said flying vehicle provides the force for moving said base unit.

References Cited

UNITED STATES PATENTS

| | | | |
|---|---|---|---|
| 1,827,438 | 10/1931 | Rauch | 244—53 |
| 1,939,156 | 12/1933 | Wright | 244—55 |
| 2,212,490 | 8/1940 | Adler | 244—53 |
| 2,433,344 | 12/1947 | Crosby. | |
| 3,149,803 | 9/1964 | Petrides et al. | 244—17.13 |
| 3,176,413 | 4/1965 | Dorniek et al. | 244—17.11 X |
| 3,234,856 | 2/1966 | Martin. | |
| 3,245,637 | 4/1966 | Eickmann | 244—2 |
| 2,969,210 | 1/1961 | Richardson et al. | 244—137 |
| 3,049,321 | 8/1962 | Nichols | 244—17.19 |
| 3,164,911 | 1/1965 | Vaughen | 180—121 XR |

FOREIGN PATENTS

| | | |
|---|---|---|
| 612,551 | 1/1961 | Canada. |
| 58,961 | 5/1913 | Austria. |
| 1,148,657 | 6/1957 | France. |

MILTON BUCHLER, Primary Examiner

PAUL E. SAUBERER, Assistant Examiner

U.S. Cl. X.R.

244—2